United States Patent
Rodrigues et al.

(10) Patent No.: US 12,269,623 B2
(45) Date of Patent: Apr. 8, 2025

(54) COATING REPAIR APPLICATION SYSTEM USING REMOTELY PILOTED AIRCRAFT

(71) Applicants: Petróleo Brasileiro S.A.—Petrobras, Rio de Janeiro (BR); Instituto Tecnológico De Aeronáutica—ITA, São José dos Campos (BR)

(72) Inventors: Clayton Eduardo Rodrigues, Rio de Janeiro (BR); Wilson Da Cunha Lara Junior, São José dos Campos (BR); Ricardo Compiani Tavares, Rio de Janeiro (BR); Carlos Cesar Aparecido Eguti, São José dos Campos (BR); Wesley Rodrigues De Oliveira, São José dos Campos (BR); Ulisses Haber Canuto, São José dos Campos (BR); Paulo Henrique Giusti, Rio de Janeiro (BR); Andre Koebsch, Rio de Janeiro (BR); Vicente Carlos Fernandes, Rio de Janeiro (BR); Kleber Roberto Da Silva Santos, Sao José dos Campos (BR)

(73) Assignees: Petróleo Brasileiro S.A.—Petrobras, Rio de Janeiro (BR); Instituto Tecnológico De Aeronáutica—ITA, São José dos Campos (BR)

( * ) Notice: Subject to any disclaimer, the term of this patent is extended or adjusted under 35 U.S.C. 154(b) by 223 days.

(21) Appl. No.: 18/077,576

(22) Filed: Dec. 8, 2022

(65) Prior Publication Data
US 2023/0182932 A1 Jun. 15, 2023

(30) Foreign Application Priority Data

Dec. 9, 2021 (BR) .................... 10 2021 024961 7

(51) Int. Cl.
*B64U 20/70* (2023.01)
*B05C 5/02* (2006.01)
(Continued)

(52) U.S. Cl.
CPC ................ *B64U 20/70* (2023.01); *B05C 5/02* (2013.01); *B05C 21/005* (2013.01); *B64U 20/87* (2023.01);
(Continued)

(58) Field of Classification Search
None
See application file for complete search history.

(56) References Cited

U.S. PATENT DOCUMENTS

| 9,567,076 | B2 * | 2/2017 | Zhang | B64U 20/87 |
| 10,017,237 | B2 * | 7/2018 | Hutson | B64U 20/70 |

(Continued)

FOREIGN PATENT DOCUMENTS

CN 209997852 U 1/2020

*Primary Examiner* — Jethro M. Pence
(74) *Attorney, Agent, or Firm* — Mintz, Levin, Cohn, Ferris, Glovsky and Popeo, P.C.

(57) ABSTRACT

The present invention provides the use of a drone, or remotely piloted aircraft, equipped with a system for applying paint or industrial coating with epoxy paint and/or polyurethane.

Coating repair application system using remotely piloted aircraft, characterized by comprising remotely piloted aircraft (9), a portable painting system (2), (5), (7) and (8), linear guide (4), distance sensors (10), camera (11), remote control (12), battery (1), lattice structure (3).

9 Claims, 4 Drawing Sheets

(51) Int. Cl.
  *B05C 21/00* (2006.01)
  *B64U 20/87* (2023.01)
  *B64U 101/26* (2023.01)
  *B64U 101/28* (2023.01)

(52) U.S. Cl.
  CPC ...... *B64U 2101/26* (2023.01); *B64U 2101/28* (2023.01); *B64U 2201/20* (2023.01)

(56) References Cited

U.S. PATENT DOCUMENTS

| | | | | |
|---|---|---|---|---|
| 10,321,663 | B2* | 6/2019 | Horton | A61B 5/0008 |
| 10,399,676 | B2 | 9/2019 | Dahlstrom | |
| 10,526,087 | B2* | 1/2020 | He | B64U 50/19 |
| 10,589,858 | B2* | 3/2020 | Kovac | G05D 1/104 |
| 10,618,652 | B2* | 4/2020 | Tamkin, Sr. | G08G 5/0021 |
| 10,717,190 | B2* | 7/2020 | Bosworth | B25J 15/0266 |
| 10,901,437 | B2* | 1/2021 | Zhang | H04N 13/204 |
| 10,969,784 | B2* | 4/2021 | Zhang | G05D 1/0088 |
| 11,008,095 | B2* | 5/2021 | Wang | B64U 30/293 |
| 11,104,437 | B1 | 8/2021 | Durand | G06T 17/05 |
| 11,124,286 | B1* | 9/2021 | Piedmonte | B64U 10/20 |
| 11,127,202 | B2* | 9/2021 | Krishna | G08G 5/0034 |
| 11,164,149 | B1* | 11/2021 | Williams | G06K 19/06028 |
| 11,169,028 | B2* | 11/2021 | Frank | G08G 5/0091 |
| 11,174,848 | B1* | 11/2021 | Rutland | B64C 25/20 |
| 11,180,263 | B2* | 11/2021 | Ratajczak | B66F 19/00 |
| 11,254,446 | B2* | 2/2022 | Ratajczak | G05D 1/46 |
| 11,332,264 | B2* | 5/2022 | Ratajczak | B64C 25/001 |
| 11,370,561 | B2* | 6/2022 | Ratajczak | B60L 53/36 |
| 11,383,859 | B1* | 7/2022 | Ratajczak | B64F 1/364 |
| 11,407,527 | B2* | 8/2022 | Ratajczak | B60L 53/16 |
| 11,443,640 | B2* | 9/2022 | Luckey | B64U 20/65 |
| 11,472,572 | B2* | 10/2022 | Ratajczak | B66D 1/48 |
| 11,485,518 | B2* | 11/2022 | Ratajczak | B64F 1/364 |
| 11,498,701 | B2* | 11/2022 | Ratajczak | B60L 53/16 |
| 11,530,025 | B2* | 12/2022 | Zhang | B64U 20/70 |
| 11,565,794 | B2* | 1/2023 | Parrott | G01N 33/0009 |
| 11,787,563 | B2* | 10/2023 | Ratajczak | G05D 1/606 |
| | | | | 244/17.27 |
| 11,787,564 | B2* | 10/2023 | Ratajczak | B60L 50/66 |
| | | | | 244/137.1 |
| 11,820,533 | B2* | 11/2023 | Ratajczak | B64U 50/19 |
| 11,846,941 | B2* | 12/2023 | Kerzner | G05D 1/0038 |
| 11,882,498 | B2* | 1/2024 | Iwai | H04W 28/06 |
| 11,891,174 | B2* | 2/2024 | Georgeson | B05B 1/28 |
| 11,932,427 | B1* | 3/2024 | Kuga | B64U 30/20 |
| 11,949,844 | B2* | 4/2024 | Li | H04N 13/204 |
| 12,006,066 | B2* | 6/2024 | Harvey | B64D 47/08 |
| 12,012,207 | B2* | 6/2024 | Watanabe | E03F 7/00 |
| 12,030,668 | B2* | 7/2024 | Ratajczak | B60L 53/16 |
| 12,037,137 | B2* | 7/2024 | Ratajczak | B64D 41/00 |
| 12,060,150 | B2* | 8/2024 | James | G05D 1/0038 |
| 12,075,159 | B2* | 8/2024 | Hu | B64C 39/024 |
| 2017/0259920 | A1 | 9/2017 | Lai et al. | |
| 2017/0305547 | A1* | 10/2017 | Tamkin, Sr. | G08G 5/0069 |
| 2020/0002000 | A1* | 1/2020 | Dahlstrom | E04G 23/002 |
| 2021/0078028 | A1 | 3/2021 | Woll | |
| 2022/0013020 | A1* | 1/2022 | Guetta | B64F 1/20 |
| 2022/0019970 | A1* | 1/2022 | Williams | G05D 1/0094 |
| 2022/0177132 | A1* | 6/2022 | Kominami | B05B 13/005 |
| 2023/0059896 | A1* | 2/2023 | Ratajczak | G08G 5/0069 |
| 2023/0066809 | A1* | 3/2023 | Lee | G08G 5/045 |
| 2023/0120424 | A1* | 4/2023 | Kominami | B05B 12/00 |
| | | | | 239/171 |
| 2023/0260097 | A1* | 8/2023 | Wang | G06T 7/0002 |
| | | | | 702/59 |
| 2023/0322422 | A1* | 10/2023 | Wainfan | B64U 20/70 |
| | | | | 244/6 |
| 2023/0418311 | A1* | 12/2023 | Zhang | G05D 1/106 |
| 2024/0043139 | A1* | 2/2024 | Ratajczak | B66F 19/00 |
| 2024/0043140 | A1* | 2/2024 | Ratajczak | B64U 60/50 |
| 2024/0076068 | A1* | 3/2024 | Kuga | B64C 39/02 |
| 2024/0089140 | A1* | 3/2024 | Decenzo | H04L 67/125 |
| 2024/0153122 | A1* | 5/2024 | Zheng | H04N 13/239 |
| 2024/0169718 | A1* | 5/2024 | Krafka | B64U 20/77 |
| 2024/0183743 | A1* | 6/2024 | Pang | B64U 50/19 |
| 2024/0245954 | A1* | 7/2024 | Cruz | B64F 1/362 |

* cited by examiner

COATING REPAIR APPLICATION SYSTEM USING REMOTELY PILOTED AIRCRAFT

CROSS-REFERENCE TO RELATED APPLICATION

This application claims priority to Brazilian Application No. 10 2021 024961 7, filed on Dec. 9, 2021, and entitled "COATING REPAIR APPLICATION SYSTEM USING REMOTELY PILOTED AIRCRAFT," the disclosure of which is incorporated herein by reference in its entirety.

FIELD OF INVENTION

The present invention is related to the painting and coating field, more specifically related to preventive maintenance in regions that present or may present corrosion.

DESCRIPTION OF THE STATE OF THE ART

Carrying out repairs to coatings is a routine and necessary activity to prevent the propagation of corrosion points in metallic structures subject to bad weathering, such as towers for burning residual gases (gas flare), draught tanks, FPSO hulls, ball storage, trusses of different metallic structures (onshore or offshore) etc. Due to the dimensions and height of these structures, this repair activity always requires the installation of scaffolding, along with other guyed support structures, such as safety cables and lashings at various anchorage points. The installation of these support structures requires, in most cases, the complete stoppage of operations in the delimited location. Due to this, small routine maintenance services are often postponed in order to justify a complete production stoppage, to prepare a more extensive site to receive the maintenance teams. Such teams are formed by specialized professionals, trained and constantly audited, to ensure all the safety aspects required for the execution of work at height.

Metallic structures, buildings and other industrial assets require, throughout their useful life, periodic maintenance in order to ensure their full functioning and maintain a constant or minimum depreciation rate. For the O&G (Oil and Gas) sector, such assets are typically made up of large structures, such as tanks, metallic structure modules, storage spheres, waste gas burning towers, etc. Each of these structures has its particularities to receive periodic maintenance, however, a common maintenance factor for all these examples is the repair of the corrosion protection coating, commonly called paint repair. Since the vast majority of these assets are structures with considerable dimensions, the repair of the coating requires the assembly of scaffolding and/or protection structures suspended by ropes, in order to provide safety to the professionals involved in the coating repair process. Thus, there are specific safety standards for carrying out the work, such as NR 35 for work at heights with risk of falling. Compliance with these regulatory standards is mandatory throughout the national territory and they serve exclusively to protect the life and health of the professionals involved, whether in the maintenance of structure coating, or any industrial professional service.

In addition to the professionals directly involved in the coating repair process, there are also work supervision and safety standards inspection teams, such as work safety technicians and engineers. In addition, for all activities that characterize work at height, the employer is still required to have teams ready to provide medical assistance on site, together with removal and rescue teams. An important point is the requirement for periodic qualification and training of all those involved, with risk analysis, collective protection equipment and work permits.

In short, a painting professional working at a height of more than 2 m has high direct and indirect costs, in addition to the risk of accidents at work. Scaffolding assembly is time consuming and requires other professionals, who are responsible for transport, assembly, disassembly and temporary storage infrastructure. Due to the various steps and requirements necessary for the scaffolding assembly, in addition to the safety procedures necessary to place an employee to perform work at height, a simple maintenance of the coating is always postponed to a time of accumulation of corrosion points. With a greater amount of corrosion, it is easier to justify a decision to stop machinery and production to carry out a complete maintenance of the structures coating.

Document US2017/0259920A1 relates to an autonomous painting system, with no degree of freedom, except for the movement of a drone, wherein the vast majority of items went to the image control and processing system.

Document US20210078028A1 discloses a coating system for applying a liquid coating, wherein the coating system includes a remotely piloted aircraft in the form of a helicopter for dispensing the coating liquid. The aerial machine has a fuselage, two rotors, a tank to contain the coating liquid, and an applicator to dispense the coating liquid and send it to a surface to be coated.

Document CN209997852U reveals an unmanned high-altitude painting machine attached to a tower that includes a remotely piloted aircraft and a paint-spraying device.

Document U.S. Pat. No. 10,399,676B2 discloses an aerial system that paints one or more designated surfaces using detachable arms and equipment. The system can paint the designated surface in one of several available techniques using paint stored in a container, such as an attached reservoir, a base station, paint can, or the like.

The prior art presented lacks the ability to apply the paint or coating in two degrees of freedom.

In view of the difficulties present in the state of the art mentioned above, and for coating repair application solutions, it arises the need to develop a technology capable of performing effectively and that is in accordance with environmental and safety guidelines. The state of the art above mentioned does not have the unique characteristics that will be presented in detail below.

OBJECT OF THE INVENTION

The objective is to provide a system capable of increasing the preventive maintenance frequency of active coatings, reducing the propagation of corrosion; reducing and/or eliminating the use of people working at heights, and reducing the number of people allocated to coating maintenance services.

BRIEF DESCRIPTION OF THE INVENTION

The present invention provides the use of a drone, or remotely piloted aircraft, equipped with a system for applying paint or industrial coating with epoxy paint and/or polyurethane.

Coating repair application system using remotely piloted aircraft, characterized by comprising remotely piloted aircraft (9), a portable painting system (2), (5), (7) and (8), linear guide (4), distance sensors (10), camera (11), remote control (12), battery (1), lattice structure (3).

BRIEF DESCRIPTION OF DRAWINGS

The present invention will be described in more detail below, with reference to the attached figures which, in a schematic and not limiting of the inventive scope, represent examples of its realization. The drawings show.

DETAILED DESCRIPTION OF THE INVENTION

Figure 1:
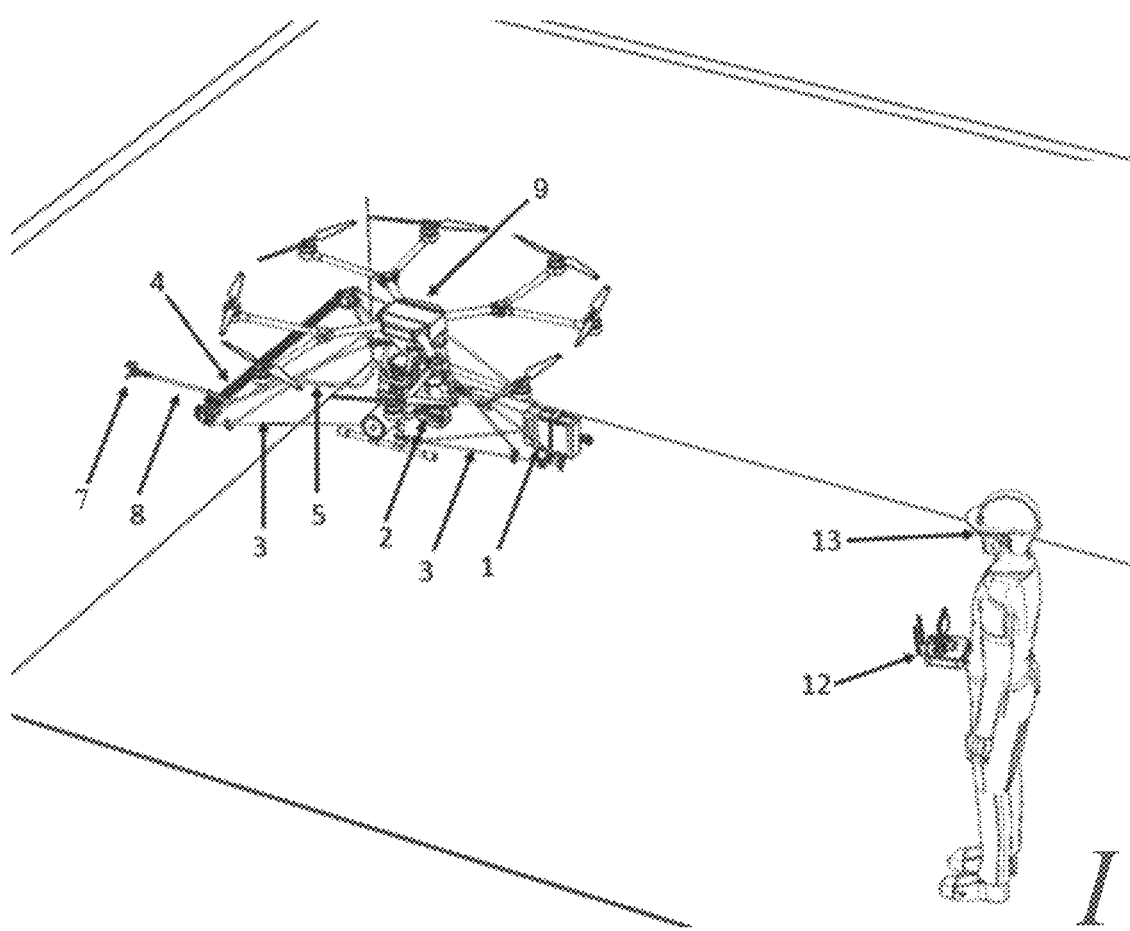
FIG. 1 illustrates a rear isometric view.
Figure 2:
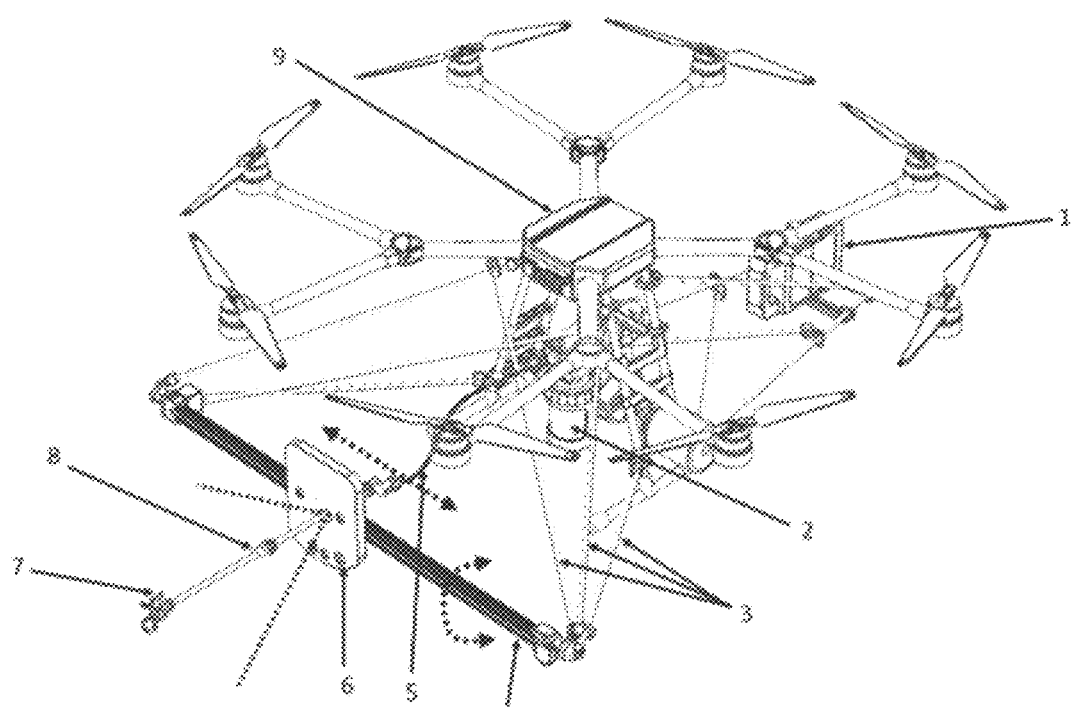
FIG. 2 illustrates a front isometric view.
Figure 3:
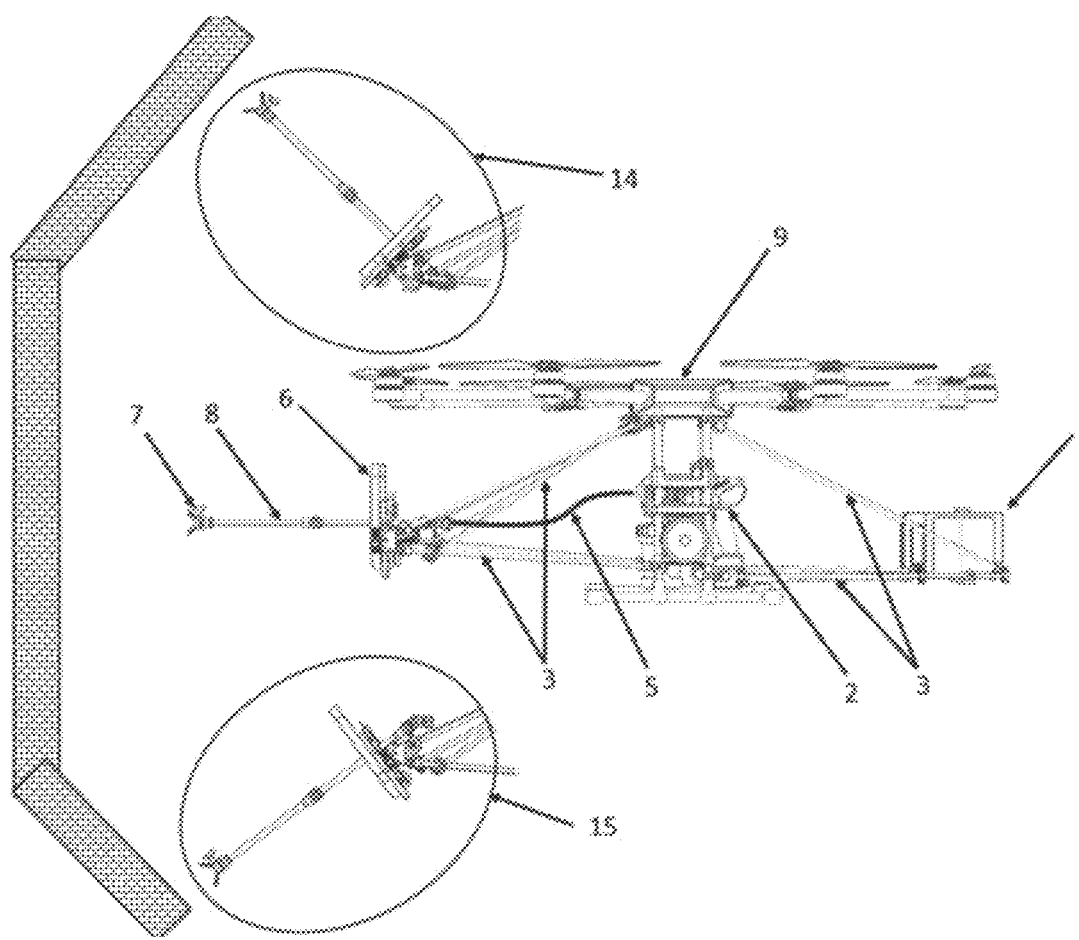
FIG. 3 illustrates a side view with the guide inclination details.
Figure 4:
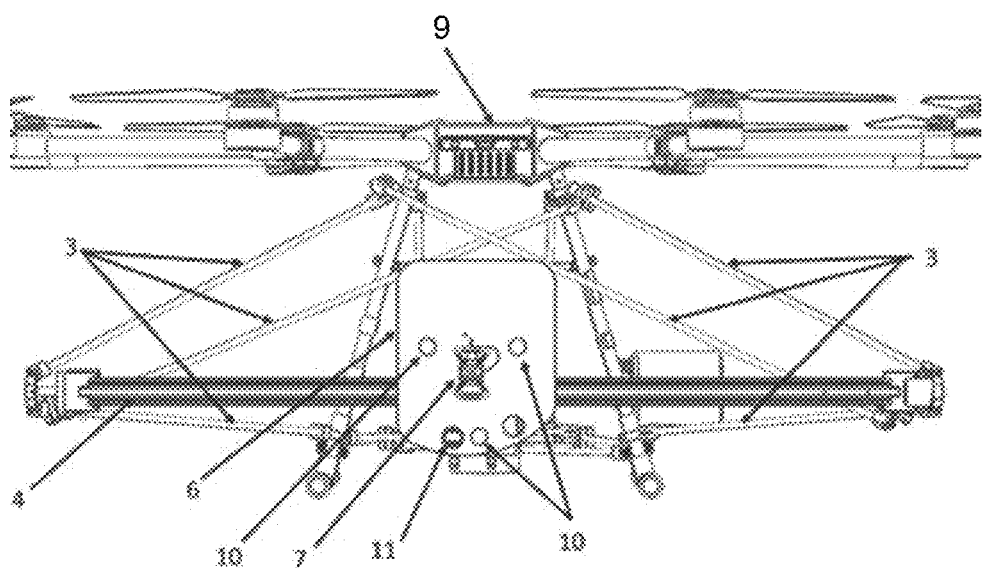
FIG. 4 illustrates a front view.

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

With the use of a drone, or remotely piloted aircraft, equipped with a system for applying industrial paint with epoxy paint and/or polyurethane, coating repair activities could have a shorter and more routine periodicity, thus ensuring a local suspension of corrosion processes. With this mobile platform for surface repair, periodic maintenance of the coating can be carried out through simple interventions in discreet points of corrosion, reducing, or even not requiring, the complete stoppage of the production processes, thus ensuring greater assertiveness in the decision-making to carry out preventive or corrective maintenance of the coating.

With the coating maintenance drone, it is possible to carry out several visits to specific corrosion points in the same structure. Depending on the conditions at the maintenance site, the equipment or process may not have to stop. Developed for the application of industrial painting with epoxy and/or polyurethane paint, corrosion points can receive a layer of coating capable of stopping the corrosion process. This allows a better planning and preparation for the structure or equipment to receive major maintenance. The project allows only one employee to pilot the drone and apply the paint. However, for safety reasons, the system is configured with two independent remote controls, requiring two employees, one for piloting the drone and the other for applying the coating. In both cases, all employees do not work at heights, allowing this activity to be carried out without exposure to risk and in the best ergonomic condition. With a smaller number of people allocated to carry out the maintenance of the coating, the risk of accidents at work and the cost of the service are drastically reduced.

The invention uses the process of applying paint without compressed air (airless). Thus, coatings that require industrial paints with thick layers of coating and high concentration of solids can make use of the invention, in the condition of area repair or covering.

The invention comprises a drone or any remotely piloted aircraft (9), which may or may not be autonomous, but not limited to the latter. This mobile platform carries a portable painting compressor (2), which can operate with or without compressed air, the latter also known as airless, but not limited to this type, and can be any portable paint application system. It also has a linear guide with 2 degrees of freedom (4) that allows lateral linear movement of the paint application nozzle (7) (sideways) and rotation of the nozzle pointing up (14) and down (15). Distance sensors (10) continuously measure the distance from the application nozzle to a frontal obstacle, which is the object that will receive the coating. The composition of the distance sensors (10) also provides the condition of the nozzle perpendicularity in relation to the painting object, transmitting this information, together with the image of the object and the process, captured by the camera (11), to the remote control system (12), being received by the system operator (13).

In order to protect the sensors (10) and the camera (11) from paint splashes, a mask (6) made of disposable or easy-to-clean material is positioned on the moving part of the linear guide (4). A flexible painting hose (5) connects the nozzle extension (8) to the portable painting compressor (2), which has a reservoir for the paint.

Both the drone (9) and its battery (1), and the portable painting system equipment (2), (5), (7) and (8), are supported by a lattice structure (3) of composite material, and can be manufactured from carbon fiber, fiberglass or metallic materials such as aluminum and its alloys.

The system remote control (12) can include the control of the drone and the painting system, can be in the same control or separated, and one alternative does not limit the other. It is up to the system operator (13) to control the drone positioning (9) and carry out the activation of the portable painting compressor (2) and the linear guide (4), the latter performing the lateral movements of the painting nozzle (7) and controls its inclination (14) and (15), which can be manually or automatically.

The invention claimed is:
1. A coating repair application system comprising:
remotely piloted aircraft;
a portable painting system comprising:
   a flexible painting hose;
   a paint application nozzle; and
   a nozzle extension fluidically connecting the paint application nozzle and the flexible painting hose, the nozzle extension supporting the paint application nozzle such that the paint application nozzle extends beyond an outer periphery of the remotely piloted aircraft;
a linear guide configured to laterally move the nozzle and the nozzle extension;
distance sensors configured to measure a distance between the paint application nozzle and a frontal obstacle;
a camera arranged to capture an image of the frontal obstacle and the paint application nozzle;
a remote control configured to control the remotely piloted aircraft or the portable painting system,
a battery; and
a lattice structure supporting at least the battery, the flexible painting hose the nozzle, and the nozzle extension.

2. The system, according to claim 1, wherein the portable painting system operates without compressed air.

3. The system, according to claim 1, wherein the linear guide has two degrees of freedom that is configured to impart lateral linear movement of the paint application nozzle and nozzle extension and a vertical inclination of the paint application nozzle and the nozzle extension.

4. The system, according to claim 1, wherein the linear guide has, positioned on itself, a mask made of disposable material or cleanable material for protecting against paint splashes on the sensors and in the camera.

5. The system, according to claim 1, wherein the flexible painting hose connects the nozzle extension to a portable painting compressor.

6. The system, according to claim 1, wherein the lattice structure comprises carbon fiber, glass fiber, or metallic materials.

7. The system, according to claim 1, wherein the remote control is a first remote control configured to control the remotely piloted aircraft, the system further comprising a second remote control configured to control the portable painting system and linear guide.

8. The system, according to claim 1, wherein the portable painting system operates with compressed air.

9. The system, according to claim 6, wherein the metallic materials comprise aluminum or aluminum alloys.

* * * * *